US012716871B2

(12) United States Patent
Lepage

(10) Patent No.: US 12,716,871 B2
(45) Date of Patent: Aug. 25, 2026

(54) ACOUSTIC INFLUENCE MAP BASED FLAW SIZE IMAGING

(71) Applicant: Evident Canada, Inc., Québec (CA)

(72) Inventor: Benoit Lepage, L'Ancienne-Lorette (CA)

(73) Assignee: Evident Canada, Inc., Québec (CA)

( * ) Notice: Subject to any disclaimer, the term of this patent is extended or adjusted under 35 U.S.C. 154(b) by 434 days.

(21) Appl. No.: 18/259,459

(22) PCT Filed: Dec. 30, 2021

(86) PCT No.: PCT/CA2021/051903
§ 371 (c)(1),
(2) Date: Jun. 27, 2023

(87) PCT Pub. No.: WO2022/147613
PCT Pub. Date: Jul. 14, 2022

(65) Prior Publication Data

US 2024/0319141 A1 Sep. 26, 2024

Related U.S. Application Data

(60) Provisional application No. 63/133,926, filed on Jan. 5, 2021.

(51) Int. Cl.
*G01N 29/06* (2006.01)
*G01N 29/44* (2006.01)
(Continued)

(52) U.S. Cl.
CPC ..... *G01N 29/0654* (2013.01); *G01N 29/4427* (2013.01); *G01N 29/4463* (2013.01);
(Continued)

(58) Field of Classification Search
CPC .......... G01N 29/4427; G01N 29/4463; G01N 2291/0289; G01N 2291/044;
(Continued)

(56) References Cited

U.S. PATENT DOCUMENTS 8,909,492 B2 12/2014 Mckeon
2008/0006091 A1 1/2008 Mckeon
(Continued)

FOREIGN PATENT DOCUMENTS

CN 116724250 A 9/2023
EP 1874192 A1 1/2008
(Continued)

OTHER PUBLICATIONS

"International Application Serial No. PCT/CA2021/051903, International Search Report mailed Mar. 29, 2022", 3 pgs.
(Continued)

*Primary Examiner* — Hwa Andrew Lee
(74) *Attorney, Agent, or Firm* — K&L Gates LLP

(57) ABSTRACT

Examples of the present subject matter provide techniques to accurately size flaws using acoustic inspection without expending significant computing resources and time. Examples described herein include techniques to convert amplitude-based inspection images, such as TFM or phased array ultrasonic testing (PAUT) images, into sizing images based on Acoustic Influence Maps (AIMs).

21 Claims, 7 Drawing Sheets

(51) Int. Cl.
*G06T 7/00* (2017.01)
*G06T 7/11* (2017.01)
*G06V 20/64* (2022.01)

(52) U.S. Cl.
CPC .............. *G06T 7/0006* (2013.01); *G06T 7/11* (2017.01); *G06V 20/64* (2022.01); *G01N 2291/0289* (2013.01); *G01N 2291/106* (2013.01); *G06T 2207/10136* (2013.01); *G06T 2207/20132* (2013.01); *G06T 2207/30136* (2013.01)

(58) Field of Classification Search
CPC .. G01N 29/0645; G01N 29/11; G01N 29/262; G06T 7/0006; G06T 7/11; G06T 2207/10136; G06T 2207/20132; G06T 2207/30136; G06V 20/64; G01S 15/8915; G01S 7/52036
See application file for complete search history.

(56) References Cited

U.S. PATENT DOCUMENTS

| | | | | |
|---|---|---|---|---|
| 2008/0034869 | A1 | 2/2008 | Heinz et al. | |
| 2020/0278323 | A1* | 9/2020 | Kwan | G01N 29/069 |
| 2021/0364472 | A1* | 11/2021 | Jack | G01N 29/2456 |

FOREIGN PATENT DOCUMENTS

| | | | |
|---|---|---|---|
| JP | H07218483 | A | 8/1995 |
| JP | 2008536578 | A | 9/2008 |
| JP | 2010266414 | A | 11/2010 |
| JP | 2011141124 | A | 7/2011 |
| JP | 2018190388 | A | 11/2018 |
| JP | 7596545 | B2 | 11/2024 |
| WO | WO-2020172747 | A1 | 9/2020 |
| WO | WO-2022147613 | A1 | 7/2022 |

OTHER PUBLICATIONS

"International Application Serial No. PCT/CA2021/051903, Written Opinion mailed Mar. 29, 2022", 4 pgs.

"Canadian Application Serial No. 3,206,113, Response filed Feb. 18, 2025 to Examiners Rule 86(2) Report mailed Oct. 18, 2024", 19 pgs.

"European Application Serial No. 21916689.9, Response filed May 21, 2025 to Extended European Search Report mailed Nov. 5, 2024", w/ English Claims, 13 pgs.

"Canadian Application Serial No. 3,206,113, Examiners Rule 86(2) Report mailed Oct. 18, 2024", 3 pgs.

"European Application Serial No. 21916689.9, Extended European Search Report mailed Nov. 5, 2024", 7 pgs.

"European Application Serial No. 21916689.9, Response to Communication pursuant to Rules 161(1) and 162 EPC filed Feb. 19, 2024", 9 pgs.

"Japanese Application Serial No. 2023-541106, Notification of Reasons for Refusal mailed Apr. 22, 2024", w/ English translation, 11 pgs.

"Japanese Application Serial No. 2023-541106, Response filed Jul. 22, 2024 to Notification of Reasons for Refusal mailed Apr. 22, 2024", w/ current English claims, 11 pgs.

* cited by examiner

ACOUSTIC INFLUENCE MAP BASED FLAW SIZE IMAGING

CROSS-REFERENCE TO RELATED APPLICATIONS

This application is a U.S. National Stage filing under 35 U.S.C. 371 from International Application No. PCT/CA2021/051903, filed on Dec. 30, 2021, which claims the benefit of priority to U.S. Provisional Patent Application Ser. No. 63/133,926, filed Jan. 5, 2021, the contents of which are incorporated herein by reference in their entireties.

TECHNICAL FIELD

The present disclosure generally relates to acoustic inspection techniques, particularly flaw size imaging.

BACKGROUND

Ultrasonic inspection can be used to inspect properties of a different structures in a non-destructive manner. Inhomogeneities on or within the structure under test can generate scattered or reflected acoustic signals in response to a transmitted acoustic pulse. Such acoustic "echoes" can be received and processed. The processing can include reconstruction of an image corresponding to a region of the structure under test, for review by an inspector or for archival. For example, a technique called a "total focusing method" (TFM) can be used to generate an image representation of the echoes where focus can be achieved across a broad spatial region on or within a structure under test. Images, such as TFM images, typically show the amplitude of the received echoes, some of them indicating flaws in the object under test.

The size of the flaw may also be useful information to obtain for inspection purposes. However, some techniques to estimate the size of the flaw from ultrasonic inspection can be laborious and cumbersome. For example, one technique called Distance Gain Sizing (DGS) method suffers from numerous deficiencies. DGS is not a imaging technique and therefore can require extensive data analysis, such as A-scan analysis. DGS is also not directly compatible with some imaging techniques, such as TFM; therefore, an intermediate step of converting into a compatible format may be needed. Moreover, DGS can have limited applications, such as pulse echo configuration, and may not be robust enough to handle other configurations. Other sizing techniques, such as automated girth weld inspection, also suffer from similar deficiencies.

BRIEF DESCRIPTION OF THE DRAWINGS

Various ones of the appended drawings merely illustrate example implementations of the present disclosure and should not be considered as limiting its scope.

DETAILED DESCRIPTION

The inventor has recognized, among other things, a need in the art for techniques to accurately size flaws using acoustic inspection without expending significant computing resources and time. Examples described herein include techniques to convert amplitude-based inspection images, such as TFM or phased array ultrasonic testing (PAUT) images, into sizing images based on Acoustic Influence Maps (AIMs), also referred to as Acoustic Region of Influence (AROI).

This document describes a method comprising: receiving acoustic echo data comprising time-series representations of acoustic echo signals from insonifying a structure in an object; based on an identification of a structure type of the structure, obtaining one or more Amplitude Influence Maps (AIMs) corresponding to the identified structure type; based on the one or more AIMs, converting amplitude values in the received acoustic echo data into one or more corresponding size values; and generating an image having pixel values representing size information of the structure based on the converted size values.

This document also describes a machine-storage medium embodying instructions that, when executed by a machine, cause the machine to perform operations comprising: receiving acoustic echo data comprising time-series representations of acoustic echo signals from insonifying a structure in an object; based on an identification of a structure type of the structure, obtaining one or more Amplitude Influence Maps (AIMs) corresponding to the identified structure type; based on the one or more AIMs, converting amplitude values in the received acoustic echo data into one or more corresponding size values; and generating an image having pixel values representing size information of the structure based on the converted size values].

This document further describes a system with one or more processors of a machine. The system also includes a memory storing instructions that, when executed by the one or more processors, cause the machine to perform operations comprising: receiving acoustic echo data comprising time-series representations of acoustic echo signals from insonifying a structure in an object; based on an identification of a structure type of the structure, obtaining one or more Amplitude Influence Maps (AIMs) corresponding to the identified structure type; based on the one or more AIMs, converting amplitude values in the received acoustic echo data into one or more corresponding size values; and generating an image having pixel values representing size information of the structure based on the converted size values.

Figure 1:
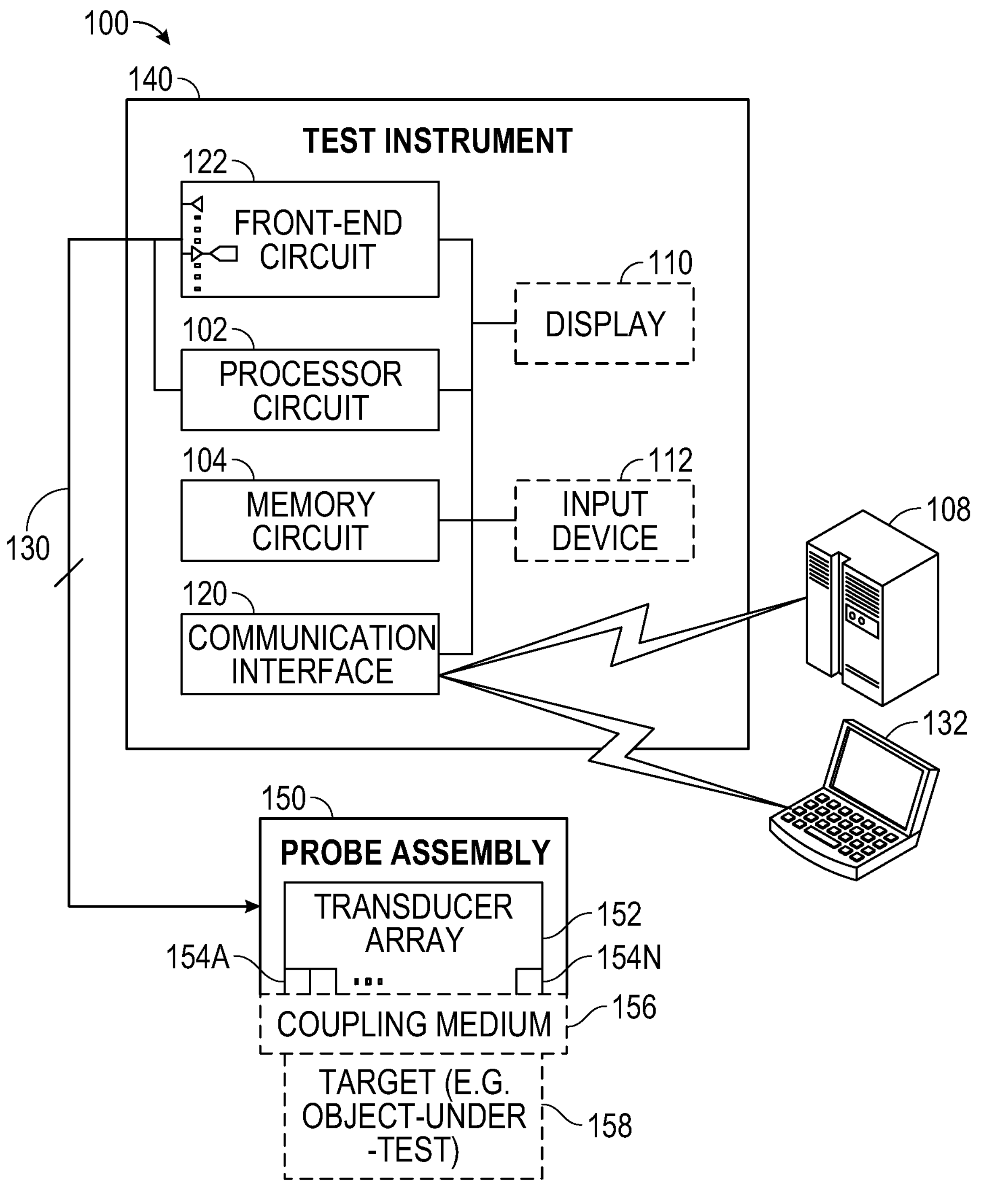
FIG. 1 illustrates an inspection system, according to an example of the present subject matter.

FIG. 1 illustrates generally an example comprising an acoustic inspection system 100, such as can be used to perform one or more techniques showed and described elsewhere herein. The inspection system 100 can include a test instrument 140, such as a hand-held or portable assembly. The test instrument 140 can be electrically coupled to a probe assembly, such as using a multi-conductor interconnect 130. The probe assembly 150 can include one or more electroacoustic transducers, such as a transducer array 152 including respective transducers 154A through 154N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

A modular probe assembly 150 configuration can be used, such as to allow a test instrument 140 to be used with different probe assemblies 150. Generally, the transducer array 152 includes piezoelectric transducers, such as can be acoustically coupled to a target 158 (e.g., an object under test) through a coupling medium 156. The coupling medium can include a fluid or gel or a solid membrane (e.g., an elastomer or other polymer material), or a combination of fluid, gel, or solid structures. For example, an acoustic transducer assembly can include a transducer array coupled to a wedge structure comprising a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front end-circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

While FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for tandem inspection. Similarly, a test protocol can be performed using coordination between multiple test instruments 140, such as in response to an overall test scheme established from a master test instrument 140, or established by another remote system such as a compute facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit 122 can be coupled to and controlled by one or more processor circuits, such as a processor circuit 102 included as a portion of the test instrument 140. The processor circuit can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a compute facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of imaging data or intermediate data such as A-scan matrices of time-series data can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

Figure 2:
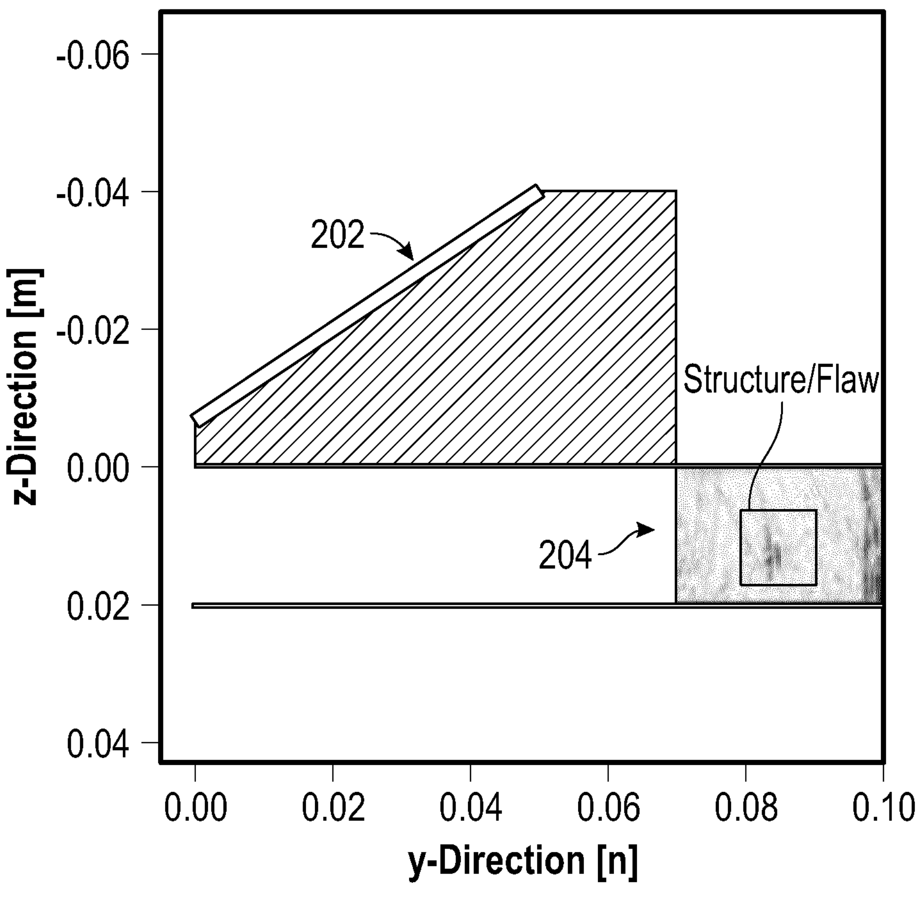
FIG. 2 illustrates generation of a TFM image, according to an example of the subject matter.

FIG. 2 illustrates generation of a TFM image from acoustic echo data obtained from ultrasonic inspection. A probe 202, as described above, may be positioned on a surface of an object as shown. The probe 202 may be used to perform acoustic inspection to generate acoustic echo data, which is used to generate a TFM image 204. The TFM image 204 is generally constructed by performing a summation of A-scan contributions from elements included on the probe 202. Generally, a TFM image may show features having contrasting pixel values (e.g. intensity values or colors) corresponding to different structures, such as flaws, in the object under test. Such contrasting regions in a TFM image 204 may indicate an approximate location of the detected structures. However, the TFM image 204 may not expressly provide an indication of flaw size of such detected structures. In generally, TFM imaging may indicate a presence or absence of a flaw, but not necessarily its exact spatial extent in terms of size or location.

Figure 3:
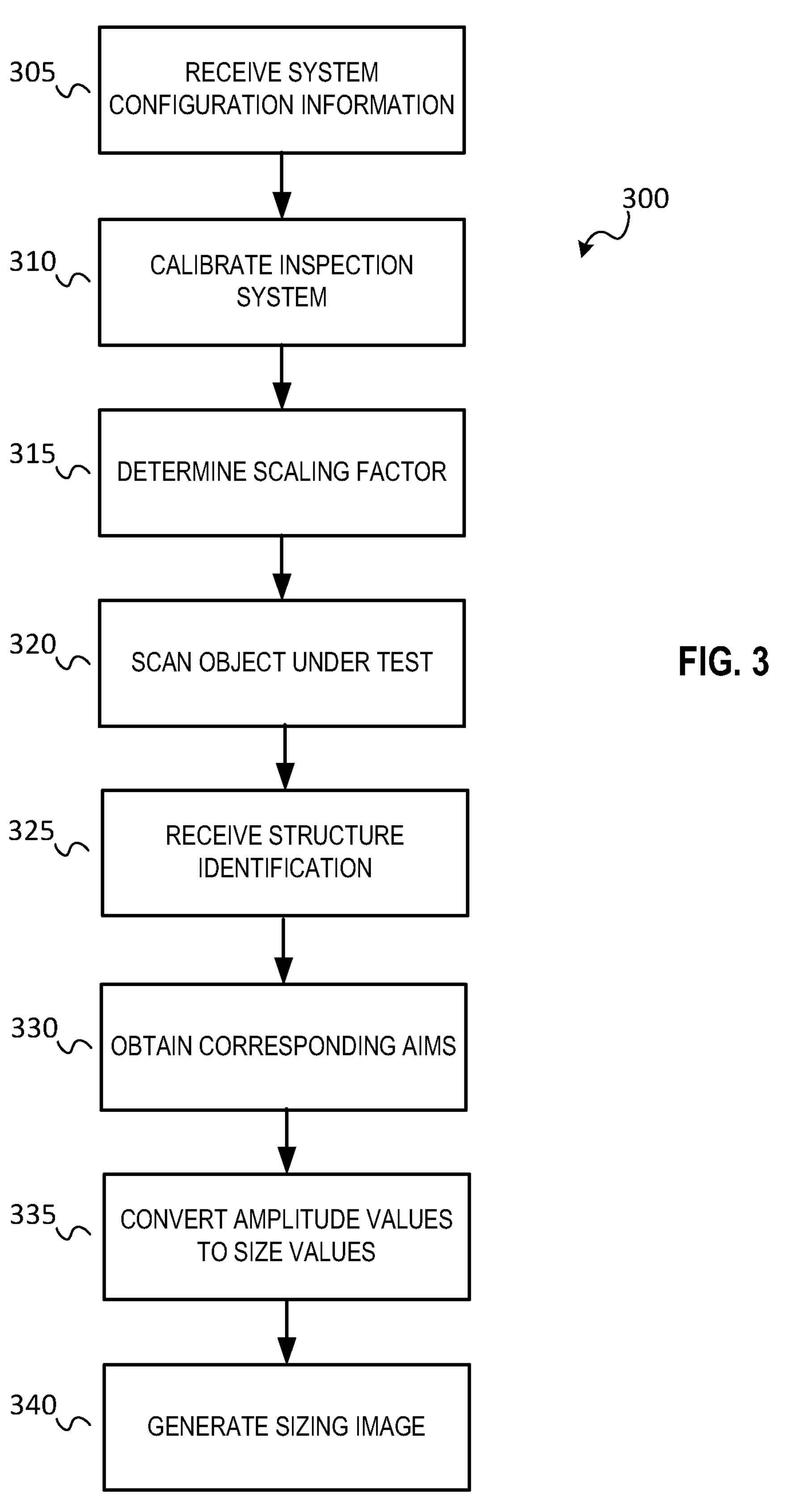
FIG. 3 is a flow diagram of a method generating a sizing image, according to an example of the subject matter.

FIG. 3 is a flow diagram for method 300 to generate a sizing image based on acoustic inspection data, according to an example of the subject matter. At 305, system configuration information for the inspection system may be received. The system configuration information may relate to configuration properties of the inspection system used to obtain acoustic inspection data. For example, the system configuration information may include one or more of probe properties, part configuration (e.g., wedge), allowed tolerances, instrument setting, physical properties, traceability information such as a date or location of testing or referencing a published standard or other test protocol, etc.

At 310, the inspection system may be calibrated. For example, the inspection system may be calibrated by scanning a known reflector, with known size and geometry, using the system configurations. Such a known reflector can include a calibration block or other assembly having "flaws" such as side-drilled holes or flat-bottom holes in specified locations. In another example, the system may be pre-calibrated, and the calibration information may be stored and retrieved. At 315, based on the system calibration (and system configurations), a scaling factor may be determined. The scaling factor, for example, may be a linear factor. The scaling factor may compensate for system-specific properties, such as applied gain, type of probe, type of piezoelectric element, length of cable, etc. The scaling factor may represent a correction factor between acoustic image (TFM, PAUT, etc.) measurements and AIM. Applying a scaling factor, as described herein, may obviate the modeling of instrument electronics and electric-to-acoustic coupling in the probe's piezo elements, for example.

At 320, an object under test may be scanned. For example, an inspector may scan a part using a probe, such as an acoustic transducer array, as discussed above. The scan may generate acoustic echo data including time-series representations of acoustic echo signal obtained using an acoustic transducer array. An acoustic image, such as TFM, PAUT, etc., may be generated from the received acoustic echo data. At 325, one or more structures, such as a flaw, may be identified from the acoustic image. For example, an inspector may identify the structure(s) in the acoustic image and may input the identification in the system. Type of identified flaws may include flat bottom hole (FBH), side drilled hole (SDH), spherical flaws, and the like. The flaws may include symmetric (e.g., SDH) and asymmetric flaws (e.g., FBH). For some flaws such as asymmetric flaws, identification may also include the orientation of the flaw. For example, an identification for a FBH may include orientation information such as an inclination angle.

At 330, based on the identification of the structure type, corresponding AIMs for the identified structure type may be obtained. The AIMs may be generated or may be retrieved from a pre-generated database. An AIM is a theoretical acoustic sensitivity map for an inspection scan plan. The AIM may include a map of predicted amplitude response of the ultrasonic inspection system for a defined flaw structure with respect to the position of said structure relative to the probe. For example, an AIM map could be produced experimentally in immersion by producing a raster scan of structure in the y,z plane (i.e., the imaging plane) and keeping maximum value only obtained during the scan sequence for every y,z position of the imaging plane. This may not be possible to do when the flaw is embedded in a metallic part. In this event, the AIM may be generated in simulation. The AIMs may be generated using techniques described in U.S. application Ser. No. 16/799,022, filed Feb. 24, 2020, entitled "Acoustic Model Acoustic Region of Influence," which is herein incorporated by reference in its entirety. The scaling factor, determined based on the system configuration, may be applied to the scanned data. In an example, one or more AIMs may be generated to match a known flaw to define the scaling factor. Other AIMs (e.g., corresponding to other imaging modes, as described below) may be generated after application of the scaling factor.

Figure 4:
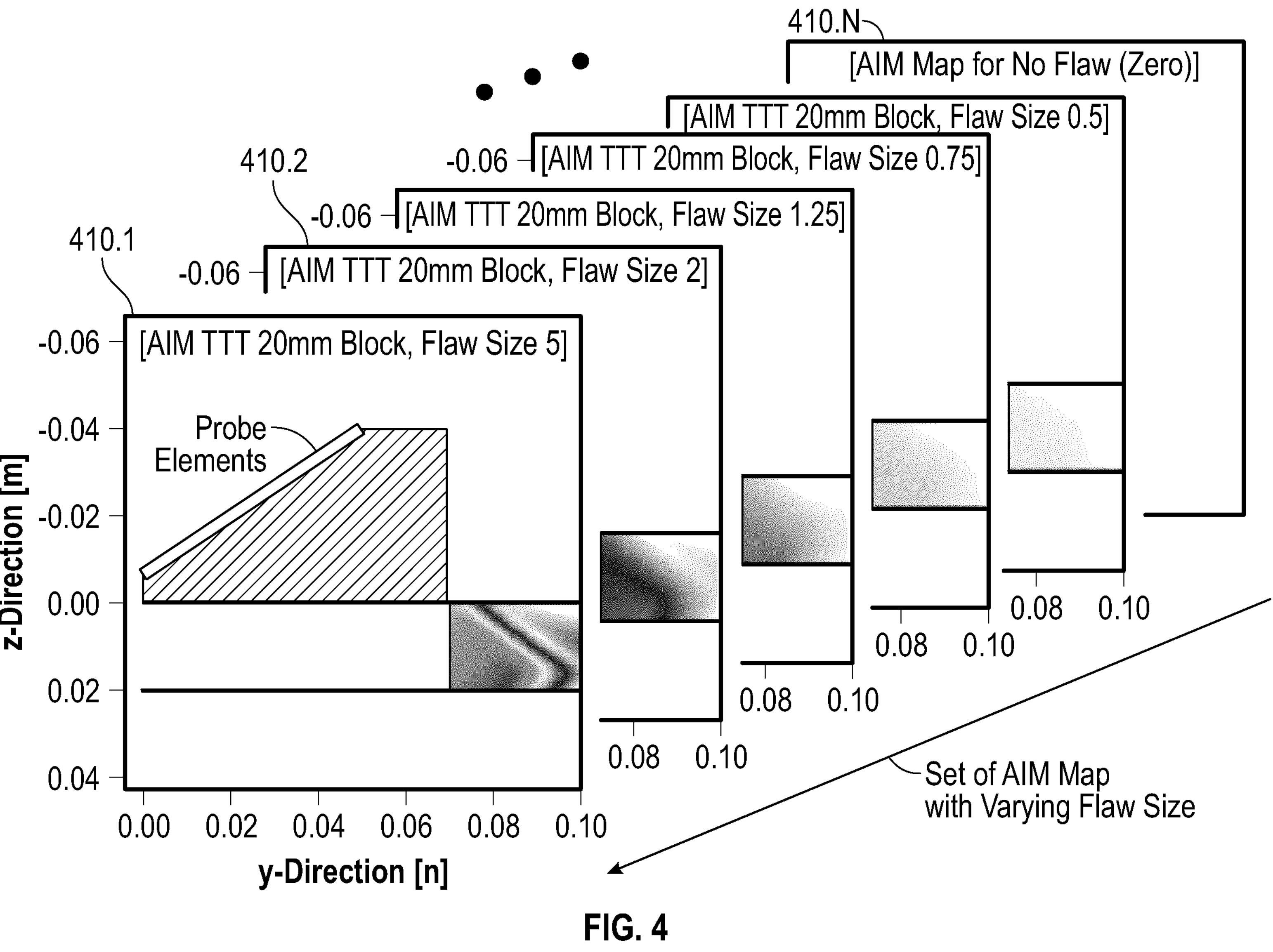
FIG. 4 illustrates a set of AIMs, according to an example of the subject matter.

FIG. 4 illustrates a set of AIMs, according to an example of the subject matter. In FIG. 4, a set of AIMs 410.1-410.N for varying flaw sizes for a FBH type structure at 3 degrees are shown. Here, AIM 410.1 may be provided for a 2 mm FHH type structure at 3 degrees while AIM 410.2 may be provided for a 5 mm FBH flaw also at 3 degrees and the other AIMs 410.3-410.N may be provided for other size FBH flaws at 3 degrees. For each structure type, a set of AIMs, may be provided, each AIM for a different size for the respective structure type.

Returning to FIG. 3, at 335, based on the obtained AIM(s), a transfer function may be applied to convert the amplitude values in the received echo data (e.g., amplitude values in TFM/PAUT image) into corresponding size values. For example, TFM amplitude for each individual voxel of an image may be transferred to sizing values using the obtained AIM. As discussed above, the AIM may include a map of predicted amplitude response of the ultrasonic inspection system for a defined flaw structure with respect to the position of said structure relative to the probe. Thus, for each TFM (or PAUT) amplitude value, a corresponding AIM may be determined and the sizing value from the respective AIM may be obtained. Moreover, interpolation of the flaw size may be used for values in between AIMs that would yield recorded amplitude values from the TFM image.

At 340, based on the converted size values for the individual voxels, an image may be generated representing sizing of the detected structures. This sizing image may use a color scale to represent the size of detected structures. For instance, a color legend may be provided to illustrate the size of the detected structures, such as the diameter size of a FBH. The image may be displayed to the inspector.

In an example, the sizing image may be cropped. Cropping may be integrated into the sizing conversion. For example, the converted data may be cropped to focus the sizing image on a region of interest (ROI) by removing extraneous information. In an example, it may be assumed that noise is uniform over the whole sizing image. Thus, based on this assumption and actual noise measurement performed on the dataset used for calibration (e.g., step 315), noise may be injected into the transfer function (e.g., step 335) to generate noise-level sizing. Cropping may then be defined based on the output of the transfer function (dataset plus noise) based on a minimum size of a structure of a given type. That is, data below the set minimum size may be removed focusing the data used for generating the sizing image on the ROI. This cropping technique provides adapted and optimized region of interest for different structures (e.g., size, type, orientation). This cropping technique may also reduce computation costs by reducing the number of pixels to calculated because only viable pixels (e.g., those above the minimum) may then be used to generate the sizing image. This cropping technique may also increase confidence level of the user (e.g., inspector) in analyzing the sizing image because only relevant information (e.g., ROI) is presented.

Moreover, sizing tolerances may be determined and provided. For example, the effect of noise on sizing may be determined and a sizing tolerance estimate based on the determined noise effect may be generated. The sizing tolerance may then be incorporated in the sizing image.

Figure 5:
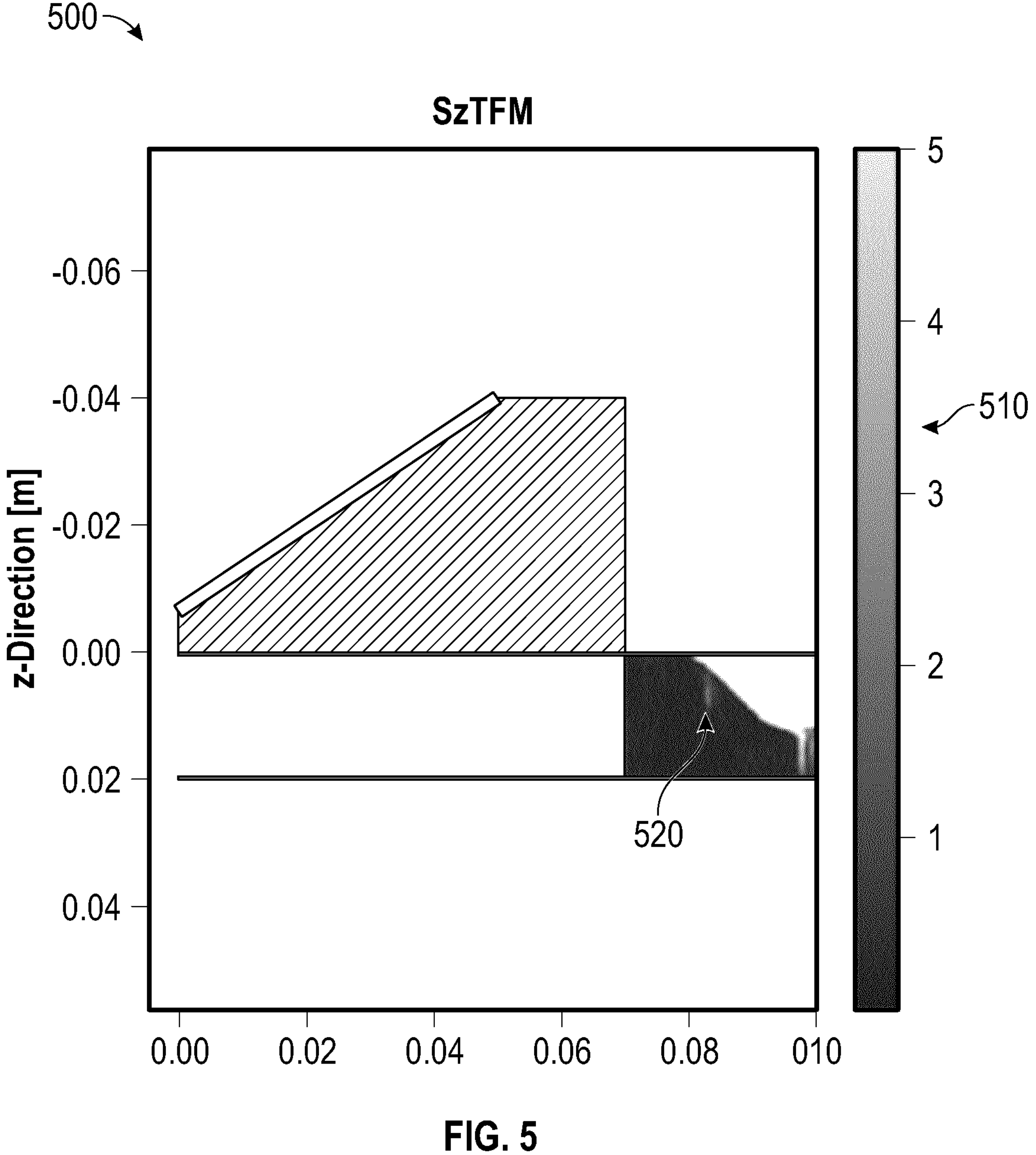
FIG. 5 is a sizing image, according to an example of the subject matter.

FIG. 5 illustrates a sizing image 500, according to an example of the subject matter. The sizing image 500 may include a color scale 510, which may be used to ascertain the size of detected structures, such as a detected FBH flaw 520.

Figure 6:
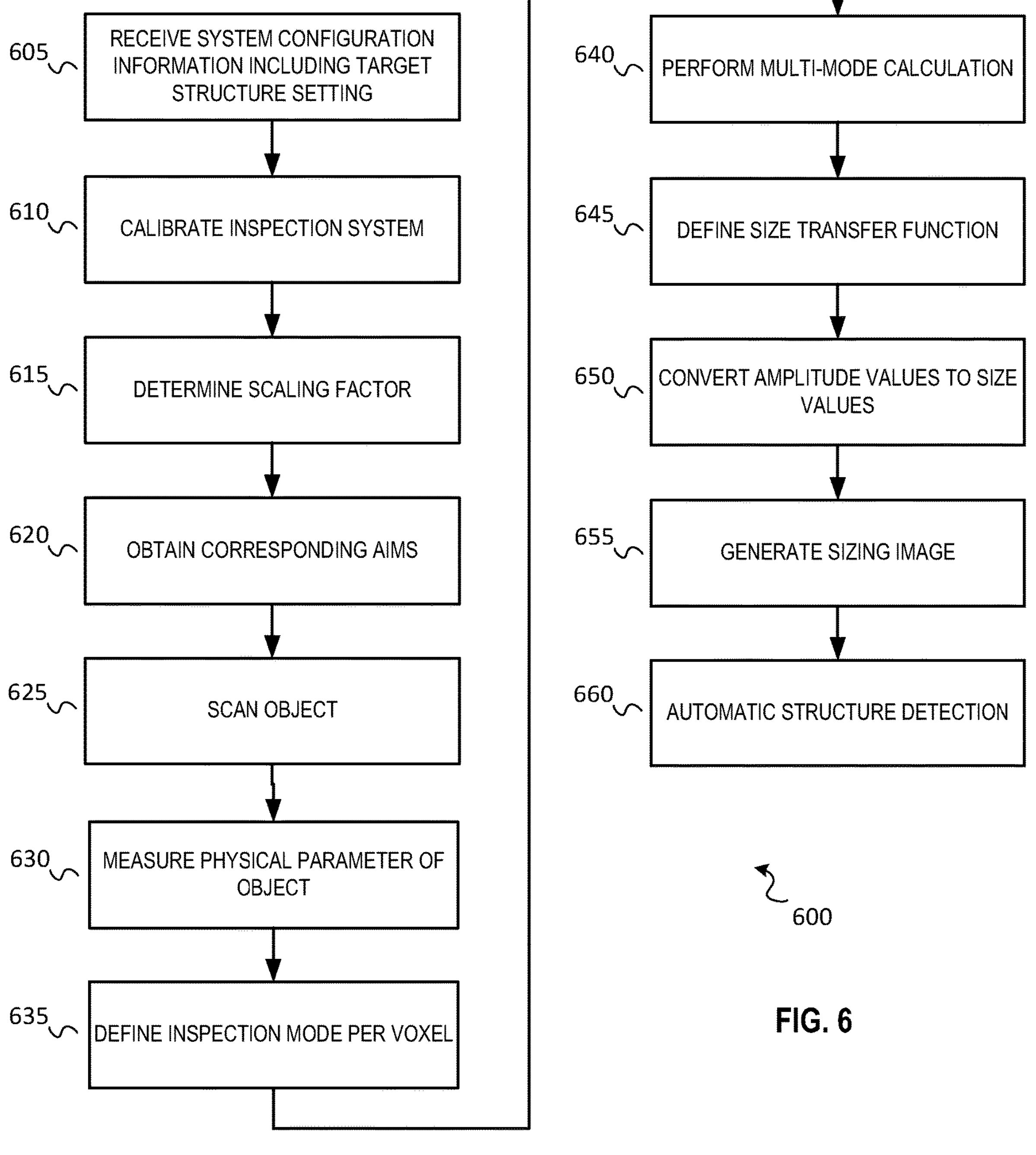
FIG. 6 is a flow diagram of a method for automatic sizing determination of detected structures, according to an example of the subject matter.

FIG. 6 is a flow diagram for method 600 for automatic sizing determination of structures detected in acoustic echo data, according to an example of the subject matter. For example, method 600 may be used to for automated weld inspection (e.g., girth weld inspection) to inspect for lack fusion type structures such as bevel lack of fusion flaw of known angle (e.g., bevel shape). Method 600 may therefore be used in place of other coarse sizing techniques such as zonal discrimination. Method 600 may also support multi-mode inspection, as further described below.

At 605, system configuration information may be received. For method 600, the system configurations may include target structure(s) setting. For example, for inspecting a bevel lack of fusion flaw, the system configurations may include settings to look for flaws oriented parallel to the bevel. The system configuration information may relate to configuration properties of the inspection system used to obtain acoustic inspection data. For example, the system configuration information may include probe properties, part configuration, allowed tolerances, instrument setting, physical properties, etc.

At 610, the system may be calibrated. For example, the inspection system may be calibrated by scanning a known reflector, with known size and geometry, using the system configurations. In another example, the system may be pre-calibrated, and the calibration information may be stored and retrieved.

At 615, based on the system calibration, a scaling factor may be determined. The scaling factor, for example, may be a linear factor. The scaling factor may compensate for system-specific properties, such as applied gain, type of probe, type of piezoelectric element, length of cable, etc. The scaling factor may represent a correction factor between acoustic image (TFM, PAUT, etc.) measurements and AIM.

At 620, corresponding AIMs for the specified structure type may be obtained. The AIMs may be generated or may be retrieved from a pre-generated database. An AIM is a theoretical acoustic sensitivity map for an inspection scan plan. The AIM may include a map of predicted amplitude response of the ultrasonic inspection system for a defined flaw structure with respect to the position of said structure relative to the probe. For example, an AIM map could be produced experimentally in immersion by producing a raster scan of structure in the y,z plane (i.e., the imaging plane) and keeping maximum value only obtained during the scan sequence for every y,z position of the imaging plane. This may not be possible to do when the flaw is embedded in a metallic part. In this event, the AIM may be generated in simulation. The AIMs may be generated using techniques described in U.S. application Ser. No. 16/799,022, filed Feb. 24, 2020, entitled "Acoustic Model Acoustic Region of Influence," which is herein incorporated by reference in its entirety. The scaling factor, determined based on the system configuration, may be applied to the scanned data. In an example, one or more AIMs may be generated to match a known flaw to define the scaling factor. Other AIMs (e.g., corresponding to other imaging modes, as described below) may be generated after application of the scaling factor. Also, the AIMs may be including varying parameters, such as wall thickness variations of the object under test.

At 625, the object under test may be scanned. For example, an inspector may scan an object using a probe, such as an acoustic transducer array, as discussed above. The inspection may generate acoustic echo data including time-series representations of acoustic echo signal obtained using an acoustic transducer array. An acoustic image, such as TFM, PAUT, etc., may be generated from the received acoustic echo data. Since method 600 may be designed for inspecting a specific type of structure, the identification of the type of structure(s) may be performed before scanning.

At 630, one or more physical parameter of the object may be measured. For example, the wall thickness of the object may be acoustically measured using the acoustic image.

At 635, an inspection mode for each voxel of the target area may be defined. The inspection mode for each voxel may be automatically selected based on measured qualities of the respective voxel. For example, the mode selection may be performed by the system based on which mode generates the smallest sizing error on a provided noise level.

At 640, if multi-mode is selected, multi-mode calculation (e.g., multi-mode TFM calculation) may be performed. At 645, a size transfer function for multi-mode size be defined based on the obtained AIMs.

At 650, based on the multi-mode calculation and defined size transfer function, the amplitude values in the received echo data (e.g., amplitude values in TFM/PAUT image) may be converted into corresponding size values. For example, TFM amplitude for each individual voxel of an image may be transferred to sizing values using the obtained AIMs. As discussed above, the AIM may include a map of predicted amplitude response of the ultrasonic inspection system for a defined flaw structure with respect to the position of said structure relative to the probe. Thus, for each TFM (or PAUT) amplitude value, a corresponding AIM may be determined and the sizing value from the respective AIM may be obtained. Moreover, interpolation of the flaw size may be used for values in between calculated AIMs that would yield recorded amplitude values from the TFM image.

At 655, based on the converted size values for the individual voxels, an image may be generated represented sizing of the detected structures. The sizing image may be provided as multi-mode sizing image. That is, a combined multi-mode image may be generated automatically by selecting, for each location in an imaging plane, the most reliable image mode (e.g., lowest sizing tolerance) and then combining the output of all modes to generate a single image for all imaging modes used. This sizing image may use a color scale to represent the size of detected structures. The image may be displayed to the inspector, for example. Generating the image may be optional in an automated detection application, as described below.

At 660, based on a size threshold for structure size, structures above the size threshold may be detected. The threshold may correspond to the minimum size of the structure to be detected. The size values for each voxel may be compared to the size threshold to determine the presence of the specified structure (e.g., bevel lack of fusion flaw) above a certain size. An alert may be generated upon detection of the specified structures above the size threshold. The alert may be a visual, audio, or other known type of alerts.

Figure 7:
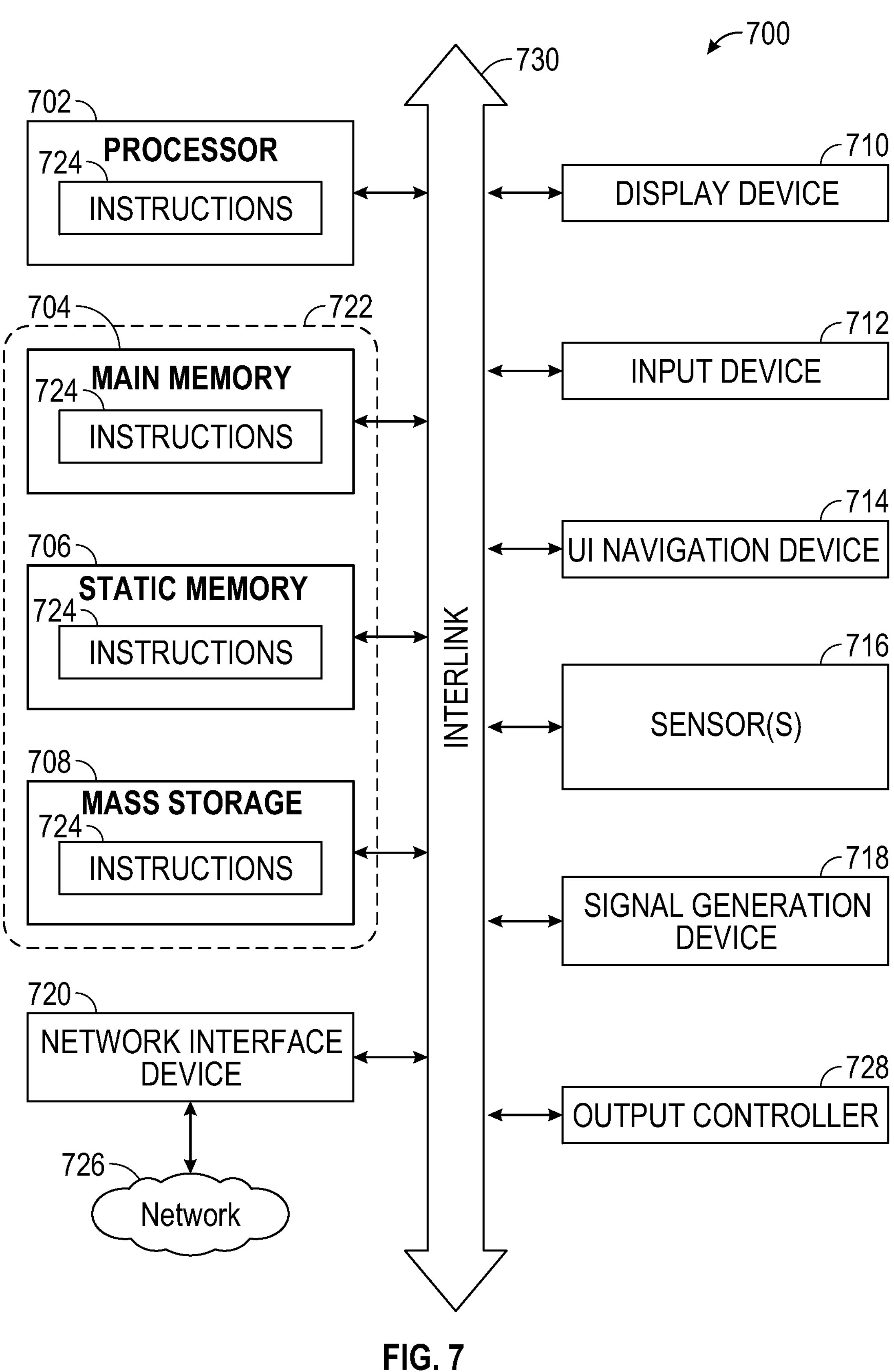
FIG. 7 illustrates a block diagram of an example comprising a machine upon which any one or more of the techniques (e.g., methodologies) discussed herein may be performed.

The techniques shown and described in this document can be performed using a portion or an entirety of an inspection system 100 as shown in FIG. 1 or otherwise using a machine 700 as discussed below in relation to FIG. 7. FIG. 7 illustrates a block diagram of an example comprising a machine 700 upon which any one or more of the techniques (e.g., methodologies) discussed herein may be performed. In various examples, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 720, an alphanumeric input device 722 (e.g., a keyboard), and a user interface (UI) navigation device 724 (e.g., a mouse). In an example, the display unit 720, input device 722 and UI navigation device 724 may be a touch screen display. The machine 700 may additionally include a storage device (e.g., drive unit) 726, a signal generation device 728 (e.g., a speaker), a network interface device 720, and one or more sensors 722, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 726 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 707, or the storage device 726 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.22 family of standards known as Wi-Fi®, IEEE 802.26 family of standards known as WiMax®), IEEE 802.25.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations. The scope of the invention should be determined with reference to the appended claims, along with the full scope of equivalents to which such claims are entitled.

What is claimed is:

1. A method comprising:

receiving acoustic echo data comprising time-series representations of acoustic echo signals from insonifying a structure in an object;

obtaining one or more Amplitude Influence Maps (AIMs) corresponding to a structure type of the structure from a pre-generated database;

based on the one or more AIMs, converting amplitude values in the received acoustic echo data into one or more corresponding size values, wherein the size values are diameter size of the structure; and generating an image having voxels representing the size values of the structure as colors based on the converted size values.

2. The method of claim 1, wherein the structure type is received from a user.

3. The method of claim 1, further comprising:

applying a scaling factor to an acoustic image generated from the acoustic echo data based on system configuration of an acoustic transducer array used to obtain the acoustic echo data, wherein the scaling factor is a correction factor between the acoustic image and the AIM.

4. The method of claim 1, further comprising:

determining an effect of noise on converting amplitude values into corresponding size values; and determining a sizing tolerance estimate based on the determined effect of noise.

5. The method of claim 1, further comprising:

identifying a region of interest based on a minimum size of the structure; and cropping the image to focus on the region of interest.

6. The method of claim 1, further comprising:

defining an inspection mode per voxel in the acoustic echo data, wherein at least two different inspection modes are used.

7. The method of claim 1, further comprising:

comparing the size values of the structure to a threshold; and based on comparing the size values to the threshold, generating an alarm.

8. A machine-storage medium embodying instructions that, when executed by a machine, cause the machine to perform operations comprising:

receiving acoustic echo data comprising time-series representations of acoustic echo signals from insonifying a structure in an object;

obtaining one or more Amplitude Influence Maps (AIMs) corresponding to a structure type of the structure from a pre-generated database;

based on the one or more AIMs, converting amplitude values in the received acoustic echo data into one or more corresponding size values, wherein the size values are diameter size of the structure; and generating an image having voxels representing the size values of the structure as colors based on the converted size values.

9. The machine-storage medium of claim 8, wherein the structure type is received from a user.

10. The machine-storage medium of claim 8, further comprising:

applying a scaling factor to an acoustic image generated from the acoustic echo data based on system configuration of an acoustic transducer array used to obtain the acoustic echo data, wherein the scaling factor is a correction factor between the acoustic image and the AIM.

11. The machine-storage medium of claim 8, further comprising:

determining an effect of noise on converting amplitude values into corresponding size values; and determining a sizing tolerance estimate based on the determined effect of noise.

12. The machine-storage medium of claim 8, further comprising:

identifying a region of interest based on a minimum size of the structure; and cropping the image to focus on the region of interest.

13. The machine-storage medium of claim 8, further comprising:

defining an inspection mode per voxel in the acoustic echo data, wherein at least two different inspection modes are used.

14. The machine-storage medium of claim 8, further comprising:

comparing the size values of the structure to a threshold; and based on comparing the size values to the threshold, generating an alarm.

15. A system comprising:

one or more processors of a machine; and a memory storing instructions that, when executed by the one or more processors, cause the machine to perform operations comprising:

receiving acoustic echo data comprising time-series representations of acoustic echo signals from insonifying a structure in an object;

obtaining one or more Amplitude Influence Maps (AIMs) corresponding to a structure type of the structure from a pre-generated database;

based on the one or more AIMs, converting amplitude values in the received acoustic echo data into one or more corresponding size values, wherein the size values are diameter size of the structure; and generating an image having voxels representing the size values of the structure as colors based on the converted size values.

16. The system of claim 15, wherein the structure type is received from a user.

17. The system of claim 15, the operations further comprising:

applying a scaling factor to an acoustic image generated from the acoustic echo data based on system configuration of an acoustic transducer array used to obtain the acoustic echo data, wherein the scaling factor is a correction factor between the acoustic image and the AIM.

18. The system of claim 15, the operations further comprising:

determining an effect of noise on converting amplitude values into corresponding size values; and determining a sizing tolerance estimate based on the determined effect of noise.

19. The system of claim 15, the operations further comprising:

identifying a region of interest based on a minimum size of the structure; and cropping the image to focus on the region of interest.

20. The system of claim 15, the operations further comprising:

defining an inspection mode per voxel in the acoustic echo data, wherein at least two different inspection modes are used.

21. The system of claim 15, the operations further comprising:

comparing the size values of the structure to a threshold; and based on comparing the size values to the threshold, generating an alarm.

* * * * *